United States Patent
Meers

(10) Patent No.: US 12,448,012 B2
(45) Date of Patent: Oct. 21, 2025

(54) CORNERPIECE OF A CONVOLUTE OF A BELLOWS OF A GANGWAY AND METHOD FOR PRODUCING SUCH A CORNERPIECE

(71) Applicant: Dellner Couplers AB, Falun (SE)

(72) Inventor: Christopher Meers, Derbyshire (GB)

(73) Assignee: Dellner Couplers AB, Falun (SE)

(*) Notice: Subject to any disclaimer, the term of this patent is extended or adjusted under 35 U.S.C. 154(b) by 740 days.

(21) Appl. No.: 17/764,941

(22) PCT Filed: Aug. 20, 2020

(86) PCT No.: PCT/EP2020/073292
§ 371 (c)(1),
(2) Date: Mar. 29, 2022

(87) PCT Pub. No.: WO2021/063595
PCT Pub. Date: Apr. 8, 2021

(65) Prior Publication Data
US 2022/0355833 A1    Nov. 10, 2022

(30) Foreign Application Priority Data

Sep. 30, 2019   (EP) ..................... 19200548

(51) Int. Cl.
*B61D 17/22*    (2006.01)
*B60D 5/00*    (2006.01)
(Continued)

(52) U.S. Cl.
CPC .............. *B61D 17/22* (2013.01); *B60D 5/00* (2013.01); *B60D 5/003* (2013.01); *B60D 5/006* (2013.01); *B61D 17/14* (2013.01); *B61D 17/20* (2013.01)

(58) Field of Classification Search
CPC ........ B61D 17/22; B61D 17/20; B61D 17/14; B60D 5/003; B60D 5/006; B60D 5/00
(Continued)

(56) References Cited

U.S. PATENT DOCUMENTS

| 6,926,344 B2 | 8/2005 | Koch et al. | |
|---|---|---|---|
| 2013/0127135 A1* | 5/2013 | Junke | B60D 5/003 280/403 |

(Continued)

FOREIGN PATENT DOCUMENTS

| CN | 1486866 A | 4/2004 |
|---|---|---|
| CN | 201914258 U | 8/2011 |

(Continued)

OTHER PUBLICATIONS

PCT/EP2020/073292 International Search Report issued Nov. 13, 2020, 6 pages.
PCT/EP2020/073292 Written Opinion issued Nov. 13, 2020, 9 pages.

*Primary Examiner* — S. Joseph Morano
*Assistant Examiner* — James William Jones
(74) *Attorney, Agent, or Firm* — Howard IP Law Group PC

(57) ABSTRACT

The invention relates to a cornerpiece (3) of a convolute (2) of a bellows (1) of a gangway, the cornerpiece (3) extending from a first end (7) intended to be connected to a further part of the convolute (2) to a second end (8) intended to either be connected to a further part of the convolute (2) or to serve as an end of the convolute, wherein the cornerpiece (3) at least for a part of its extend from the first end (7) to the second end (8) has the shape of a trough that is bent into an arc, wherein the trough has a bottom line (9) or a bottom area (18), wherein the cornerpiece (3) has a first piece (10) that is a cut-away from sheet material and has a second piece (11) that is a cut-away from sheet material, wherein the first piece (10) is joined to the second piece (11) along a line of connection (12), wherein the line of connection crosses the bottom line or the bottom area.

18 Claims, 4 Drawing Sheets

(51) Int. Cl.
*B61D 17/14* (2006.01)
*B61D 17/20* (2006.01)

(58) Field of Classification Search
USPC .......................................................... 105/18
See application file for complete search history.

(56) References Cited

U.S. PATENT DOCUMENTS

2016/0046161 A1* 2/2016 Piacsek ................... B61F 15/22
  29/454
2019/0019936 A1* 1/2019 Imai ....................... H02N 11/00

FOREIGN PATENT DOCUMENTS

| | | | | |
|---|---|---|---|---|
| CN | 206733982 U | * | 12/2017 | ............. B60D 5/003 |
| CN | 206954236 U | | 2/2018 | |
| CN | 209366152 U | * | 9/2019 | ............. B61D 17/22 |
| DE | 0653319 A1 | * | 5/1995 | |
| DE | 19638154 A1 | * | 3/1998 | ............. B60D 5/003 |
| DE | 10154033 A1 | | 12/2002 | |
| DE | 202015105102 U1 | | 11/2015 | |
| EP | 0631890 A1 | | 1/1995 | |
| EP | 1995086 A1 | | 11/2008 | |
| EP | 3290287 A1 | | 3/2018 | |
| JP | 2006220299 A | * | 8/2006 | ............. B60D 5/003 |
| KR | 20110005333 A | * | 1/2011 | |
| KR | 101063729 B1 | | 9/2011 | |

* cited by examiner

CORNERPIECE OF A CONVOLUTE OF A BELLOWS OF A GANGWAY AND METHOD FOR PRODUCING SUCH A CORNERPIECE

CROSS-REFERENCE TO RELATED APPLICATIONS

This application is the national stage application under 35 U.S.C. § 371 of International Application No. PCT/EP2020/073292 filed on Aug. 20, 2020, which claims priority to EP 19200548.6 filed on Sep. 30, 2019, the entire disclosures of which are incorporated herein by reference in their entireties.

FIELD OF INVENTION

The invention relates to a cornerpiece of a convolute of a bellows of a gangway. The invention also relates to a method for producing a cornerpiece of a convolute of a bellows of a gangway. The invention also relates to a convolute of a bellows of a gangway. The invention also relates to a bellows.

BACKGROUND

Bellows for connecting a first car of a multi-car vehicle with a second car of a multi-car vehicle are known. EP 2 468 600 A1 describes such a bellows. The bellows shown in EP 2 468 600 A1 is made up of an outer bellows ("äußerer Balg 12") and an inner bellows ("innerer Balg 15"). The outer bellows is described to have the apex ("Scheitel") of its convolutes ("Wellen") pointing in the direction of the inner bellows. The inner bellows is described to have its apex pointing outwards towards the outer bellows. As can be seen from FIG. 2 of EP 2 468 600 A1, the individual convolute ("Welle") of the respective bellows is made up of several pieces. Each convolute is shown to be made up of a first side part, for example arranged as right-hand side part of the individual convolute in FIG. 2, a cornerpiece that connects the right-hand side part of the convolute with a top part of the convolute as well as a further cornerpiece that connects the top part of the respective convolute with a further part of the convolute, namely that part of the convolute that is arranged at the left-hand side of the individual convolute as shown in FIG. 2. FIG. 2 of EP 2 468 600 A1 shows that the individual cornerpiece extends from a first end that is intended to be connected to a further part of the convolute (for example the right-hand part of the convolute) to a second end that is intended to be connected to a further part of the convolute (for example the top part of the individual convolute). FIG. 2 also shows that the cornerpiece—in the design proposed in EP 2 468 600 A1—for its entire extent from the first end to the second end has the shape of a trough that is bent into an arc. FIG. 2 of EP 2 468 600 A1 exemplifies that two ways of bending the trough-shaped cornerpiece into an arc can be possible. The inner bellows of EP 2 468 600 A1 has an inwardly bent arc. The radius of the bottom line of the trough is larger than the radius of the rims at the top of the sidewalls of the trough. The outer bellows of EP 2 468 600 A1 has an outwardly bent arc. The radius of the bottom line of the trough is smaller than the radius of the rims at the top of the sidewalls of the trough.

Several methods for producing cornerpieces for convolutes of a bellows of a gangway are known. In a first method the cornerpiece is a one-piece element that is for example produced by casting or extruding. In an alternative method for producing a cornerpiece of a convolute known to the skilled person, the cornerpiece has a first piece that is a cut-away from sheet material and has a second piece that is a cut-away from sheet material and has an apex piece, wherein the first piece is joined to the apex piece along a line of connection and the second piece is also joined to other apex piece along a (different) line of connection. In the embodiments known to the skilled person from his practical experience, the lines of connection run parallel to the bottom line of the trough.

SUMMARY

Given this background, the problem to be solved by the invention is to provide a design for a cornerpiece of a convolute of a bellows of a gangway that can be produced at lower costs while at the same time providing the comparable strength against tearing as cornerpieces of the prior art provide.

This problem is solved by the cornerpiece, the method for producing a cornerpiece, the use of a cut-away, the convolute of a bellows and the bellows according to the present disclosure.

The invention is based on the concept of providing a new orientation of the line of connection between the first piece that is a cut-away from the sheet material and the second piece that is a cut-away from a sheet material. Also new shapes of the first piece and the second piece are suggested in preferred embodiments. Instead of having the lines of connection run in parallel to the apex, the invention suggests to have the line of connection cross the bottom line or have the line of connection cross the bottom area and/or have the line of connection cross the apex.

Tests with a cornerpiece according to the invention have shown, that the cornerpiece according to the invention has comparable abilities to cornerpieces known from the prior art. However, the new orientation of the line of connection that has been suggested by the invention allows the connection between the first piece and the second piece to be made with reduced efforts. It is even feasible to have the first piece be connected to the second piece along the line of connection by way of one line of stitching that runs that along the line of connection. Given that the cornerpieces of the prior art for those embodiments where a first piece and a second piece are connected to an apex piece by way of stitching shows two lines of two parallel stitching that run parallel to the apex of the cornerpiece (four lines of stitching in total), the ability of the invention to provide an especially preferred embodiment, whereby the connection between the first piece and the second piece is provided by one line of stitching, provides a substantial reduction in manufacturing time and manufacturing costs. This advantage is, however, not only realized if the connection method of stitching is used. Similar advantages can be obtained by other means of connecting the first piece to the second piece, for example by stapling, by rivets, by a Velcro connection or by gluing. Also, the invention in a preferred embodiment allows to do away with the apex piece, hence again reducing the efforts necessary to prepare the pieces that are to be used during manufacturing of the cornerpiece.

It is the belief of the inventors that the new three-dimensional orientation of the line of connection strengthens the cornerpiece better than any way of connection that would run along the apex or would run in parallel to the apex.

The cornerpiece has a first end that is intended to be connected to a further part of the convolute. This first end in a preferred embodiment is made up by a rim of material. In a preferred embodiment, the first end is a U-shaped rim or a C-shaped rim or a V-shaped rim. In a preferred embodiment, the rim of material that makes up the first end of the cornerpiece lies in one plane.

The cornerpiece has a second end that is intended to be connected to a further part of the convolute or is to serve as an end of the convolute. This second end in a preferred embodiment is made up by a rim of material. In a preferred embodiment, the first end is a U-shaped rim or a C-shaped rim or a V-shaped rim. In a preferred embodiment, the rim of material that makes up the second end of the cornerpiece lies in one plane.

The cornerpiece at least for a part of its extent from the first end to the second end has the shape of a trough that is bent into an arc. The term "shape of a trough" in the context of the description of this invention is intended to relate to a channel that is delimited by walls at two sides and a bottom, whereby the two walls preferably face each other and run parallel to each other. The channel opens towards the top and preferably has a first open end and a second open end. Designs are feasible where a kink exists between the bottom wall and a respective side wall. This would lead to a design with two kinks that preferably run parallel to each other. In such a design, the bottom wall could be a flat wall. The flat bottom wall would then provide a bottom area. In an alternative and more preferred embodiment, the transition from side wall to bottom wall is continuous. Preferably, the deepest part of the trough runs along a bottom line. Preferably, the bottom line is bent into an arc. In a preferred embodiment, the trough in cross sections that run perpendicular to the tangents of a bottom line that is bent into an arc have the shape of a U or a C or a V.

In a preferred embodiment, each side wall of the trough-shaped cornerpiece ends in a rim. In a preferred embodiment, the rim at the end of the side wall of the trough-shaped cornerpiece has the shape of an arc. As indicated above, the trough that makes up at least a part of the cornerpiece can be a channel that opens towards the top and preferably has a first open end and a second open end. Preferably, the top is delimited by the rims of the sidewalls, while the first open end makes up the first end of the cornerpiece and is provided by a U-shaped rim or a C-shaped rim or a V-shaped end-rim of the sidewalls, while the second open end of the channel makes up the second end of the cornerpiece and is provided by a U-shaped rim or a C-shaped rim or a V-shaped end-rim of the sidewalls.

According to the invention, the cornerpiece at least for a part of its extent from the first end to the second end has the shape of a trough that is bent into an arc. Embodiments of the invention are possible, where the trough has a part that is bent into an arc and then has a part that continues along a straight line. The cornerpiece can also be made of a trough that first extends along a straight line, then is bent into an arc and then continues along a straight line again. Providing parts of the trough that extend along a straight line at either end of that part of the trough that is bent into an arc can provide for connection areas that facilitate the connection of the first end or the second end with further parts of the convolute. Areas where the trough extends along a straight line can be used as overlapping areas for further parts of the convolute. If this area is a part of a trough that extends along a straight line, the overlapping of two pieces of material can be accomplished more easily. Also providing a connection between the further part of the convolute and the respective end of the cornerpiece, especially if it is done by way of stitching, stapling, rivets, a Velcro connection or by way of gluing can be made more easily, if the respective end of the cornerpiece is the end of a part of the trough that extends in a straight line.

In an alternative embodiment, the cornerpiece for its entire extent from the first end to the second end has the shape of a trough that is bent into an arc.

The cornerpiece has a first piece that is a cut-away from sheet material and has a second piece that is a cut-away from sheet material. According to the invention, the first piece is joined to the second piece along a line of connection. According to the invention, the line of connection crosses the bottom line or crosses the bottom area and/or crosses the apex.

In a preferred embodiment, the line of connection crosses the bottom line and/or the bottom area and/or the apex only once.

In a preferred embodiment, the line of connection starts at a first point at the first end or close to the first end, whereby the shortest distance from the first point to a point on the apex of the cornerpiece along the surface of the cornerpiece has a first length. In this embodiment, the line of connection travels along the cornerpiece from the first point. The line of connection comes closer towards the apex the further the line of connection is away from the first point until the line of connection crosses the apex. In a preferred embodiment, the line of connection moves further away from the apex after it has crossed the apex and the further the line of connection is away from the apex and the closer it is to a second point that is at the second end or close to the second end of the cornerpiece.

In a preferred embodiment, the line of connection starts at a first point at the first end or close to the first end, whereby the shortest distance from the first point to a point on the bottom line of the cornerpiece along the surface of the cornerpiece has a first length. In this embodiment, the line of connection travels along the cornerpiece from the first point. The line of connection comes closer towards the bottom line the further the line of connection is away from the first point until the line of connection crosses the bottom line. In a preferred embodiment, the line of connection moves further away from the bottom line after it has crossed the bottom line and the further the line of connection is away from the bottom line and the closer it is to a second point that is at the second end or close to the second end of the cornerpiece.

In a preferred embodiment, the line of connection starts at a first point at the first end or close to the first end, whereby the shortest distance from the first point to a point on the bottom area of the cornerpiece along the surface of the cornerpiece has a first length. In this embodiment, the line of connection travels along the cornerpiece from the first point. The line of connection comes closer towards the bottom area the further the line of connection is away from the first point until the line of connection crosses the bottom area. In a preferred embodiment, the line of connection moves further away from the bottom area after it has crossed the bottom area and the further the line of connection is away from the bottom area and the closer it is to a second point that is at the second end or close to the second end of the cornerpiece.

The term "line of connection" in the use of the description of this invention is not to be understood as limited to the mathematical understanding of the term "line". The line of connection is understood as that part of the cornerpiece, where the first piece is joined to the second piece. If joining the first piece to the second piece is done by having a part of the first piece overlap a part of the second piece, whereby in the area where these parts overlap, a stitching, stapling, rivets, a Velcro connection or gluing is provided, then the width of the "line of connection" is to be the width of this area, while the "length" of the "line of connection" is the lengthwise extent of this area.

In a preferred embodiment, the first piece is joined to the second piece along the line of connection by stitching, by stapling, by rivets, by a Velcro connection or by gluing. In an especially preferred embodiment, two methods of connection are jointly used to join the first piece to the second piece. For example, the first piece can be glued to the second piece, whereby the connection is reinforced by stitching. If the first piece is connected to the second piece, preferably, the connection is made by one single line of stitching or by two single lines of stitching that run in parallel to each other.

In a preferred embodiment, a first rim section of the first piece forms part of the first end of the cornerpiece and a second rim section of the first piece forms part of the second end of the cornerpiece, wherein the length of the first rim section of the first piece is smaller than the length of the second rim section of the first piece. In addition or as an alternative, a first rim section of the second piece forms part of the second end of the cornerpiece and a second rim section of the second piece forms part of the first end of the cornerpiece, wherein the length of the first rim section of the second piece is smaller than the length of the second rim section of the first piece. In a preferred embodiment, the first rim section of the first piece has the same length as the first rim section of the second piece. In a preferred embodiment, the second rim section of the first piece has the same length as the second rim section of the second piece.

In a preferred embodiment, the first piece is a cut-away from laminate sheet material. In addition or as an alternative, the second piece is a cut-away from laminate sheet material. The laminate sheet preferably contains silicone rubber. The laminate sheet preferably contains aramid and/or polyester fabric. In a preferred embodiment the lamiant sheet has one or two or has more than two plies of fabric. The laminate sheet in addition or as an alternative can also contain other rubber materials, for example CSM (Chlorosulfonated Polyethylene), or chlorosulfonated polyethylene, for example Hypalon. The laminate sheet in addition or as an alternative can also contain other fabrics, for example nylon.

In a preferred embodiment, the connection between the first piece and the second piece can be sealed, for example if it is made by stitching. For example a room temperature curing silicone sealant can be brushed onto the surface, and injected into the joint on both the inside face and outside face.

The method for producing a cornerpiece of a convolute of a bellows of a gangway by way of joining a first piece that is a cut-away from sheet material to a second piece that is a cut-away from sheet material, suggests that the first piece is a cut-away from sheet material that has an inner curved rim and an outer curved rim, wherein the inner curved rim is curved about a first center point and has a first radius and the outer curved rim is curved about a second center point that lies on the same side of the first piece as the first center point, but is different to the first center point, whereby the curvature of the outer curved rim has a second radius,
and the second piece is a cut-away from sheet material that has an inner curved rim and an outer curved rim, wherein the inner curved rim is curved about a first center point and has a first radius and the outer curved rim is curved about a second center point that lies on the same side of the second piece as the first center point, but is different to the first center point, whereby the curvature of the outer curved rim has a second radius.

According to the invention the outer curved rim of the first piece is joined to the outer curved rim of the second piece. Having the outer curved rim of the first piece be joined to the outer curved rim of the second piece according to the invention is to be understood to allow the first piece and the second piece to overlap in the respective area that neighbours the actual outer curved rim. Hence this wording is to include that it is not the exact outer curved rim of the first piece that is joined to the exact outer curved rim of the second piece. This wording simply is to indicate that the first piece is joined to the second piece at the side of its outer curved rim and not at the side of its inner curved rim and that the second piece is joined to the first piece at the side of its outer curved rim and not at the side of its inner curved rim.

The invention also suggests the use of a cut-away from sheet material that has an inner curved rim and an outer curved rim, wherein the inner curved rim is curved about a first center point and has a first radius and the outer curved rim is curved about a second center point that lies on the same side of the cut-away as the first center point, but is different to the first center point, whereby the curvature of the second rim has a second radius to produce a cornerpiece of a convolute of a bellows of a gangway According to the invention, a convolute of a bellows of a gangway has a corner piece corner piece according to the invention.

In a preferred embodiment, the convolute has a side part that has the shape of a straight trough that extends from a first end of the side part to a second end of the side part, whereby the first end of the side part is connected to the first end of the cornerpiece. The cornerpiece at its second end can be connected to a top part of the convolute. The top part can also have the shape of a straight trough. Convolutes are also known, where between a side-part and a top part an angled side part is arranged. In such a design, a first cornerpiece can be arranged between the side part (that typically runs vertical) and a angled side part (that runs at an angle to the vertical), while a second cornerpiece is arranged between the angled side part and a top part (that typically runs horizontally).

The bellows of a gangway according to the invention is made up of several convolutes according to the invention.

BRIEF DESCRIPTION OF DRAWINGS

Below the invention will be described in more detail by way of reference to drawings that only show exemplary embodiments of the invention. In the drawings show FIG. 1 a perspective partial view onto a bellows according to the invention FIG. 2 a perspective partial view onto a convolute of a bellows according to the invention FIG. 3 a perspective partial view onto a convolute of a bellows according to the invention FIG. 4 a perspective view onto a cornerpiece of a convolute of a bellows according to the invention FIG. 5 a top view onto the first piece of a cornerpiece of a convolute of a bellows according to the invention FIG. 6 a cross-section across the cornerpiece according to the invention.

DETAILED DESCRIPTION

Figure 1:
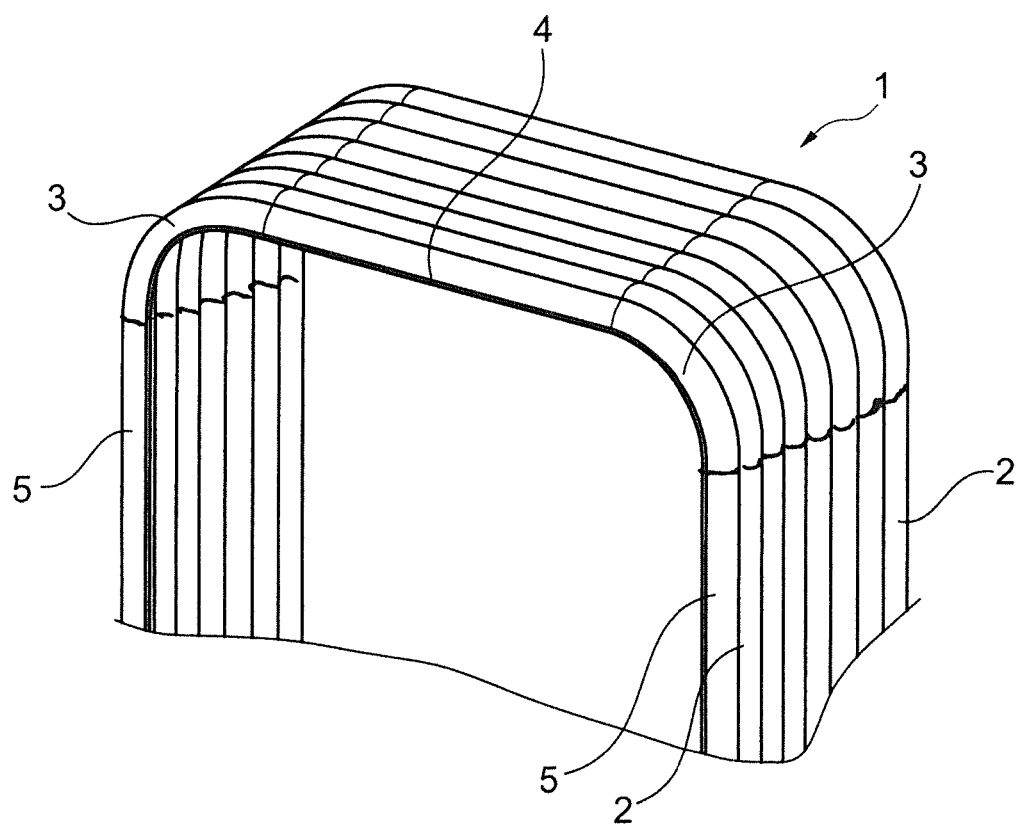

FIG. 1 shows a perspective partial view onto a bellows 1. The bellows is made up of several convolutes 2 that are attached to each other. In the embodiment shown in FIG. 1, the bellows is designed as an outward facing bellows, namely with the individual convolutes 2 of the bellows 1 opening towards the inside of the gangway, while the rounded bottoms of the individual convolutes 2 are arranged further outward.

The individual convolute 2 has cornerpieces 3. In the embodiment shown in FIG. 1 the individual convolute 2 would have four cornerpieces 3, of which only two are shown in FIG. 1, namely the ones arranged in the top right hand and top left hand corner of the individual convolute. The further two cornerpieces 3, namely the one in the bottom left hand corner and the one in the bottom right hand corner are not shown in FIG. 1.

FIG. 1 shows that further parts of the convolute 3 are arranged neighboring the cornerpieces 3. In the design shown in FIG. 1, the individual convolute 3 has a top piece 4. The top piece 4 borders a convolute 3 at each of its end. A respective end of the convolute 3 is connected to a respective end of the top piece 4. The individual convolute 3 shown in FIG. 1 furthermore has two side pieces 5, one arranged on the right hand side, one arranged on the left hand side. A respective end of the convolute 3 is connected to a respective end of the side piece 5.

Figure 2:
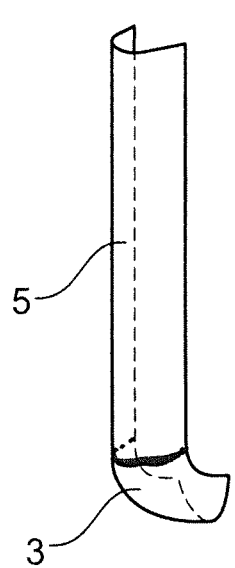

FIG. 2 shows that in one possible embodiment, the side piece 5 of the individual convolute is attached to one of the two cornerpieces 3 arranged at the bottom of the bellows 1 and further shows that in this embodiment, the bellows 1 terminates at a free end of the convolute 3 (the second end 8 of the convolute 3).

Figure 3:
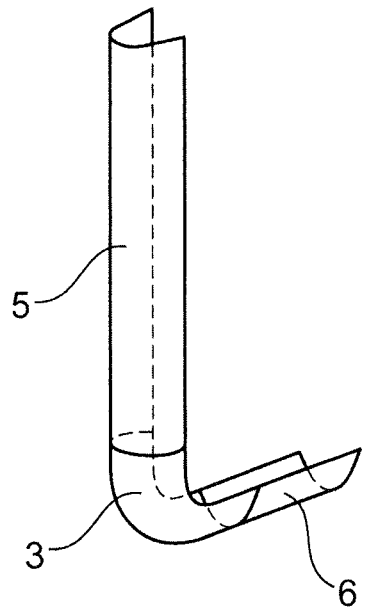

FIG. 3 shows that in one possible embodiment, the side piece 5 of the individual convolute is attached to one of the two cornerpieces 3 arranged at the bottom of the bellows 1 and further shows that in this embodiment, the bellows 1 has a bottom piece 6 that is attached to an end of the convolute 3.

Figure 4:
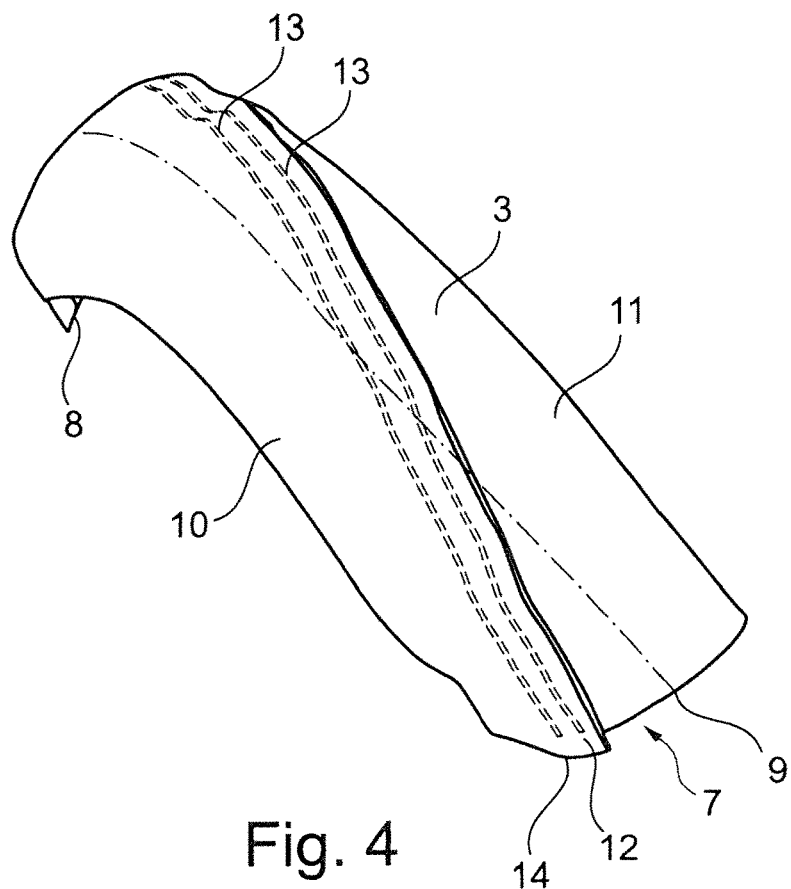

The cornerpiece 3 of a convolute 2 of a bellows 1 of a gangway as shown in FIG. 4 extends from a first end 10 intended to be connected to a further part of the convolute 2, for example the side piece 5 or the top piece 4, to a second end 8 intended to either be connected to a further part of the convolute 2, for example a bottom piece 6, or to serve as an end of the convolute 2. The cornerpiece 3 shown in FIG. 4 for its extend from the first end 7 to the second end 8 has the shape of a trough that is bent into an arc wherein the trough has a bottom line 9. The trough-shaped cornerpiece has a channel that is delimited by walls at two sides and a bottom, whereby the two walls preferably face each other and run parallel to each other and join at the bottom (see FIG. 6). The channel opens towards the top, where it is delimited by the rims of the sidewalls (the inner curved rim of the respective piece) and has a first open end and a second open end, the first open end being at the first end 7 of the convolute 2 and the second open end being at the second end 8 of the convolute 2.

The cornerpiece 3 has a first piece 10 that is a cut-away from sheet material and has a second piece 11 that is a cut-away from sheet material. The first piece 10 is joined to the second piece 11 along a line of connection 12. The line of connection 12 crosses the bottom line 9.

The first piece 10 is joined to the second piece 11 along the line of connection 12 by stitching 13. FIG. 4 shows two parallel lines of stitching 13.

As shown in FIG. 4, a first rim section 14 of the first piece 10 forms part of the first end 7 of the cornerpiece 3.

Figure 5:
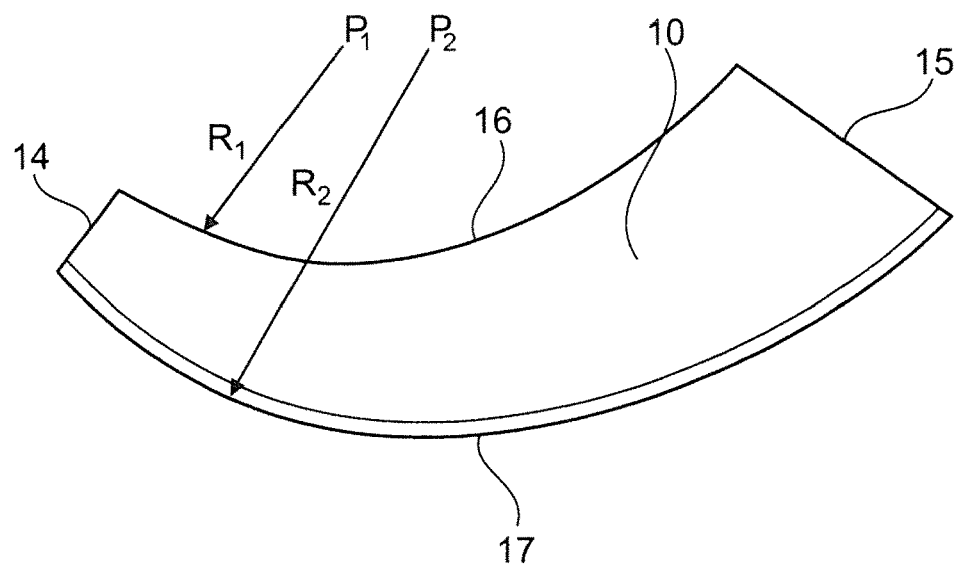

FIG. 5 shows a top view onto the first piece 10. The top view shows that the first piece 10 has a first rim section 14 (that forms part of the first end 7 of the cornerpiece 3 as shown in FIG. 4) and a second rim section 15 of the first piece 10 that forms part of the second end 8 of the cornerpiece 3, wherein the length of the first rim section 15 of the first piece 10 is smaller than the length of the second rim section 15 of the first piece 10.

FIG. 5 shows also shows that the first piece 10 as a cut-away from sheet material has an inner curved rim 16 and an outer curved rim 17, wherein the inner curved rim 16 is curved about a first center point and has a first radius and the outer curved rim 17 is curved about a second center point that lies on the same side of the first piece 10 as the first center point, but is different to the first center point, whereby the curvature of the outer curved rim 17 has a second radius that is different from the first radius.

To produce the cornerpiece 3 of a convolute 2 of a bellows 1 of a gangway the first piece 10 that is a cut-away from sheet material is joined to the second piece 11 that preferably has the same shape as the first piece 10, whereby the outer rim 17 of the first piece 10 is joined to the outer rim of the second piece 11.

Figure 6:
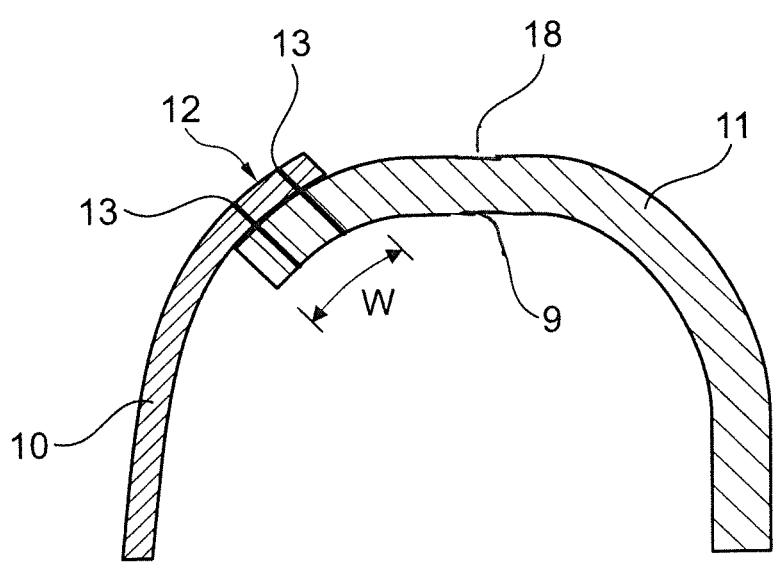

FIG. 6 shows a cross-section of a cornerpiece 3 according to the invention. FIG. 6 shows the first piece 10 being joined to the second piece 11 by way of two lines of stitching 13. The bottom line 9 that runs along the bottom of the trough-shaped cornerpiece 3 is indicated as a dot in this cross-sectional view of FIG. 6. A further dot symbolizes the line of the apex 18 that runs along the outside of the cornerpiece 3. In the embodiment shown in the FIGS. 4 to 6, the bottom line 9 and the line of the apex 18 are parallel lines. The bottom line 9 runs along the inner surface of the trough-shaped cornerpiece 3 (along the bottom of the trough), the line of the apex 18 runs along the outside surface of the trough-shaped cornerpiece 3.

As can be seen in FIG. 6, joining the first piece to the second piece is done by having a part of the first piece overlap a part of the second piece in this embodiment, whereby in the area where these parts overlap, a stitching 13 is provided. The width W of the "line of connection 12" is to be the width of this area, while the "length" of the "line of connection" is the lengthwise extent of this area (see FIG. 4).

Figure 7:
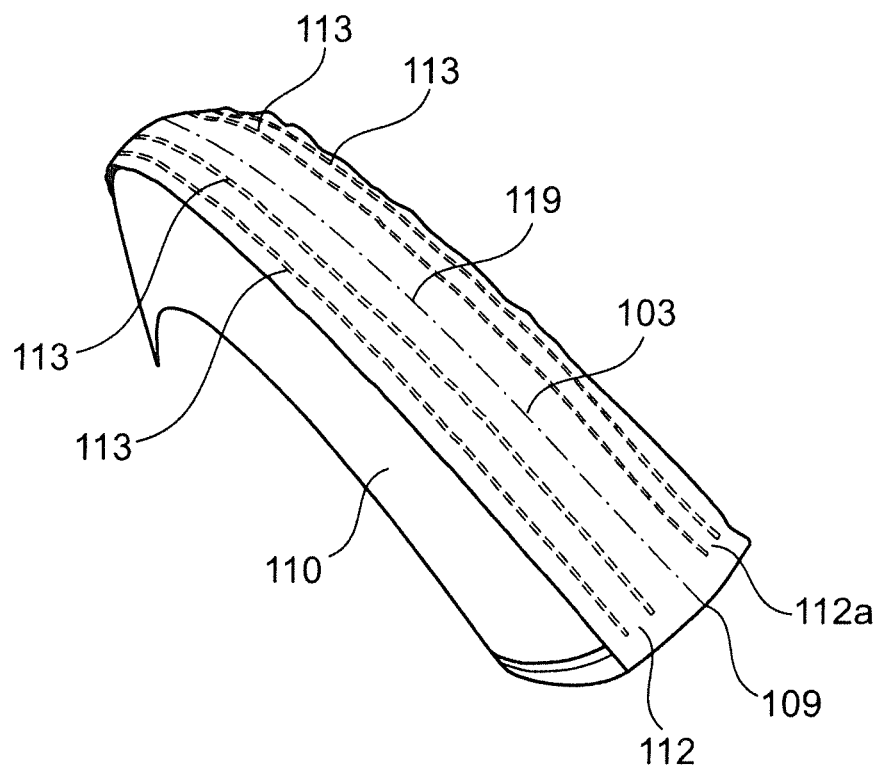
FIG. 7 a perspective view onto a cornerpiece of a convolute of a bellows that does not belong to the invention FIG. 8 a top view onto the pieces used to manufacture the cornerpiece of FIG. 7
Figure 8:
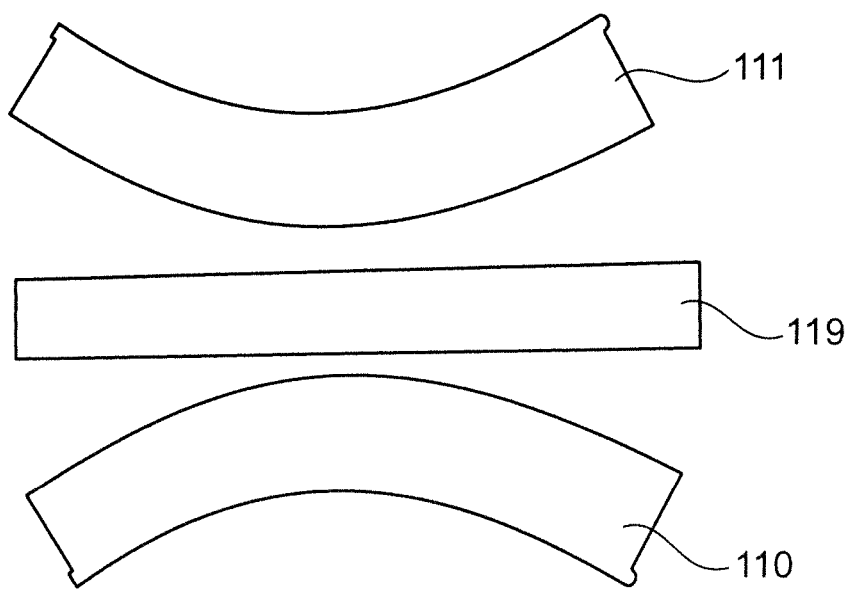

FIG. 7 shows a perspective view onto a cornerpiece 103 of a convolute of a bellows that does not belong to the invention. FIG. 8 shows a top view onto the pieces used to manufacture the cornerpiece of FIG. 7. The convolute 103 is made up of a first piece 110, a second piece 111 and an apex piece 119. The first piece 110 is connected to the apex piece 119 along a first line of connection 112 by way of two lines of stitching 113. The second piece 111 is connected to the apex piece 119 along a second line of connection 112a by way of two lines of stitching 113. The first line of connection 112 and the second line of connection 112a run in parallel to each other and in parallel to the bottom line 109. The first line of connection 112 and the second line of connection 112a do not cross the bottom line 109.

The invention claimed is:

1. A cornerpiece of a convolute of a bellows of a gangway, comprising:
the cornerpiece extending from a first end to a second end, the first end adapted for connecting to a further part of the convolute, and the second end adapted for connecting to a further part of the convolute, or for serving as an end of the convolute,
wherein the cornerpiece at least for a part of its extent from the first end to the second end has a shape of a trough that is bent into an arc, the trough having a bottom line and/or an apex;
a first piece that is a cut-away from sheet material;
a second piece that is a cut-away from sheet material,
wherein the first piece is joined to the second piece along a line of connection; and
wherein the line of connection crosses the bottom line and/or the apex.

2. The cornerpiece of claim 1, wherein the second end is adapted for connecting to the further part of the convolute.

3. The cornerpiece of claim 1, wherein the second end is adapted for serving as the end of the convolute.

4. The cornerpiece of claim 1, wherein the trough has said bottom line running along an inner surface of the trough-shaped cornerpiece, and said apex running along an outer surface of the trough-shaped cornerpiece, wherein the apex and bottom line are generally parallel to one another.

5. The cornerpiece of claim 1, wherein the line of connection crosses the bottom line and the apex.

6. The cornerpiece of claim 1, wherein the first piece is joined to the second piece along the line of connection by at least one of stitching, staples, rivets, hook and loop fastener, or adhesive.

7. The cornerpiece of claim 6, wherein the first piece is joined to the second piece along the line of connection by adhesive comprising a glue.

8. The cornerpiece of claim 1, further comprising:
a first rim section of the first piece forming part of the first end of the cornerpiece, and a second rim section of the first piece forming part of the second end of the cornerpiece, wherein the length of the first rim section of the first piece is smaller than the length of the second rim section of the first piece.

9. The cornerpiece of claim 1, further comprising:
a first rim section of the second piece forming part of the second end of the cornerpiece, and a second rim section of the second piece forming part of the first end of the cornerpiece, wherein the length of the first rim section of the second piece is smaller than the length of the second rim section of the first piece.

10. The cornerpiece of claim 1, further comprising:
a first rim section of the first piece forming part of the first end of the cornerpiece and a second rim section of the first piece forming part of the second end of the cornerpiece, wherein the length of the first rim section of the first piece is smaller than the length of the second rim section of the first piece; and
a first rim section of the second piece forming part of the second end of the cornerpiece and a second rim section of the second piece forming part of the first end of the cornerpiece, wherein the length of the first rim section of the second piece is smaller than the length of the second rim section of the first piece.

11. The cornerpiece of claim 1, wherein at least one of the first piece is a cut-away from laminate sheet material and the second piece is a cut-away from laminate sheet material.

12. The cornerpiece of claim 1, wherein the first piece is a cut-away from laminate sheet material and the second piece is a cut-away from laminate sheet material.

13. The cornerpiece of claim 1, wherein the first piece is joined to the second piece along the line of connection by stitching; and
wherein the stitching is sealed by room temperature curing silicone sealant.

14. A convolute according to claim 1, comprising a side part that has the shape of a straight trough that extends from a first end of the side part to a second end of the side part, wherein the first end of the side part is connected to the first end of the cornerpiece.

15. A bellows of a gangway, the bellows having a plurality of convolutes comprising cornerpieces according to claim 1, and attached to one-another to form the bellows.

16. A method for producing a cornerpiece of a convolute of a bellows of a gangway comprising:
providing a first piece as a cut-away from sheet material having an inner curved rim and an outer curved rim, wherein the inner curved rim is curved about a first center point and has a first radius, and wherein the outer curved rim is curved about a second center point that lies on the same side of the first piece as the first center point, but is different to the first center point, whereby the curvature of the outer curved rim has a second radius,
providing a second piece as a cut-away from sheet material having an inner curved rim and an outer curved rim, wherein the inner curved rim is curved about a first center point and has a first radius, and wherein the outer curved rim is curved about a second center point that lies on the same side of the second piece as the first center point, but is different to the first center point, whereby the curvature of the outer curved rim has a second radius,
joining the first piece to the second piece such that the outer curved rim of the first piece is joined to the outer curved rim of the second piece along a line of connection; wherein the line of connection crosses a bottom line and/or apex of a trough formed in said cornerpiece.

17. The method of claim 16, further comprising connecting a first end of a side part having a shape of a straight trough that extends from a first end of the side part to a second end of the side part, to the first end of the cornerpiece.

18. The method of claim 16, wherein joining the first piece to the second piece comprises at least one of stitching, stapling, riveting, hook and loop fastening, or adhesive connecting.

* * * * *